May 18, 1965
G. V. DELAIRE
3,184,071
PLASTIC CASE FOR CONTAINERS
Filed Dec. 12, 1962
2 Sheets-Sheet 1
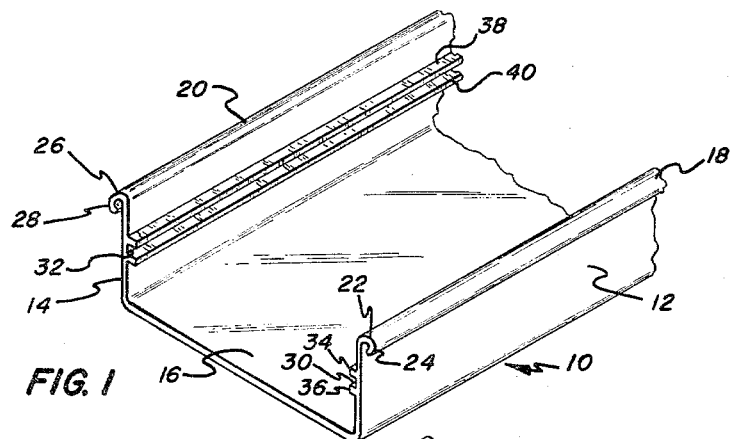
FIG. 1
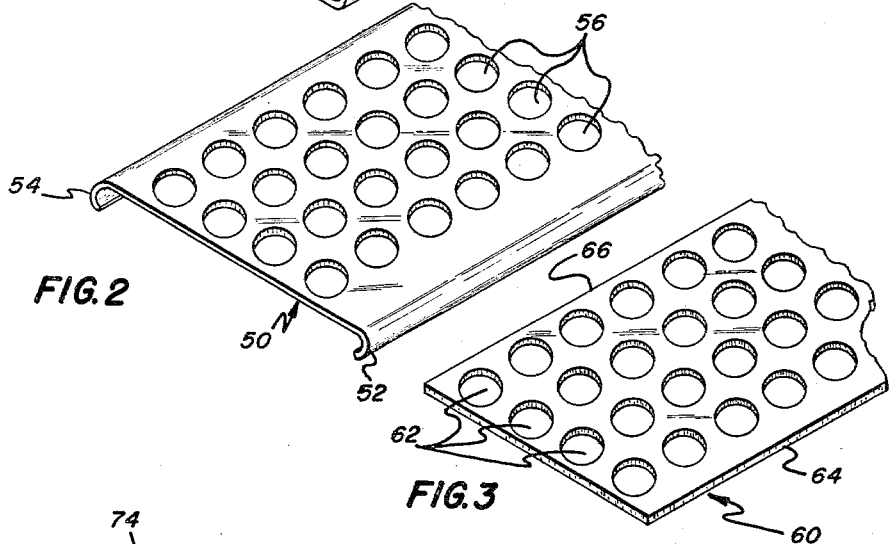
FIG. 2
FIG. 3
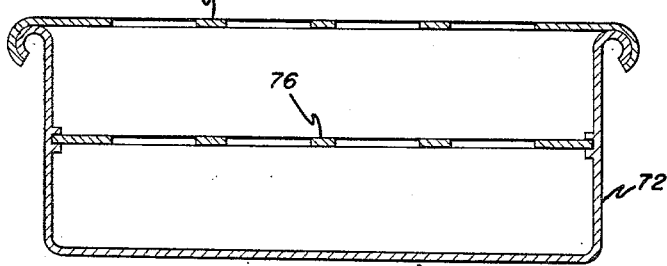
FIG. 4
GERARD V. DELAIRE
INVENTOR.
BY *R. Frank Smith*
*Charles J. Board*
ATTORNEYS May 18, 1965  G. V. DELAIRE  3,184,071

PLASTIC CASE FOR CONTAINERS

Filed Dec. 12, 1962  2 Sheets-Sheet 2

GERARD V. DELAIRE
INVENTOR.

BY R. Frank Smith
Charles L. Board

ATTORNEYS

United States Patent Office 3,184,071
Patented May 18, 1965

3,184,071
PLASTIC CASE FOR CONTAINERS
Gerard V. Delaire, Kingsport, Tenn., assignor to Eastman Kodak Company, Rochester, N.Y., a corporation of New Jersey
Filed Dec. 12, 1962, Ser. No. 244,045
14 Claims. (Cl. 211—74)

This invention relates to plastic cases for use in supporting containers and like articles. More particularly, this invention relates to novel plastic cases comprised of a plurality of separate extruded members.

Plastic cases have been prepared by injection molding. While satisfactory plastic cases can be produced by injection molding, cases produced in this manner have not received wide-spread acceptance owing to the fact that injection molded plastic cases are relatively expensive. The expense involved in producing injection molded plastic cases results primarily from the expense of the mold employed. Furthermore, for mass production, a large number of these expensive molds is required.

This invention is concerned with the production of plastic cases for supporting containers and like articles such, for example, as milk containers, beer containers, and soft drink containers. The several members or components of which the plastic case is comprised are prepared initially by the relatively inexpensive extrusion method of forming plastic materials into desired shapes.

The economics of the extrusion method for forming plastic materials into desired shapes is well known in the art. Tool costs are relatively low when compared to other methods of forming plastic type materials into desired shapes and structures. See, for example, page 99 of the November 1957, issue of Modern Plastics.

For a complete understanding of this invention, reference is made to the following detailed description and drawing, in which:

FIG. 1 is a view in perspective of an extruded member,

FIG. 2 is a view in perspective of an extruded member provided with apertures,

FIG. 3 is a view in perspective of a divider member provided with apertures,

FIG. 4 is a view in cross section of a plastic case,

Figure 5:
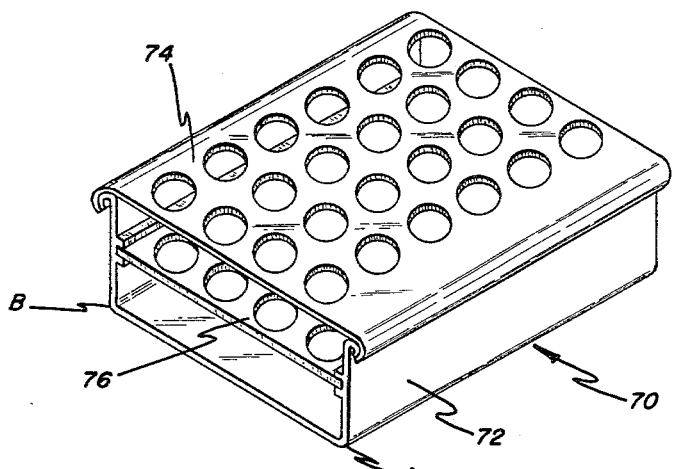
FIG. 5 is a view in perspective of a plastic case.

In accordance with this invention, there is provided a novel plastic case for use in supporting containers and like articles such as beer containers, milk containers, soft drink containers, and the like.

The plastic case of this invention is comprised of a plurality of individual members all secured together, preferably in a manner such that the individual members can be easily and readily detached one from the other. The individual members of which the case is comprised will be detailed more fully hereinafter. An important and critical aspect of this invention is the fact that all the basic members or components of which the plastic case of the invention is constructed can be produced, and preferably are produced, by extrusion techniques.

The resins that can be employed in preparing the plastic case of this invention are numerous. Substantially any extrudable resinous material can be employed provided that the extruded member prepared therefrom is of sufficient rigidity and strength to perform its intended function. Stabilizers, fillers, pigments, lubricants, antioxidants, and the like, can be incorporated into the resin prior to extrusion thereof if desired or required. Selection of the proper additives for a specific resin or resinous composition is within the skill of those versed in the art.

Examples of resins that can be employed to prepare the extruded members of which the plastic case of this invention is comprised include the organic acid esters of cellulose such as cellulose acetate, cellulose acetate butyrate, cellulose acetate propionate, cellulose triacetate, cellulose butyrate, and cellulose propionate; the polyolefins such as polyethylene, polypropylene, and poly-1-butene; styrene polymers such as polystyrene and the copolymers of acrylonitrile and styrene; the polyamides such as polycaprolactam (nylon 6), polyhexamethylene adipamide (nylon 66), and polyhexamethylene sebacamide (nylon 610); the acrylic resins, preferably the high-impact strength types, such as polymethylmethacrylate, polyethylacrylate, and polymethylacrylate; the vinyl polymers such as polyvinyl chloride and vinyl chloride-vinyl acetate copolymer; the polycarbonates; and the polyesters such as polyethylene terephthalate, and the polyester derived by the condensation of 1,4-cyclohexanedimethanol and terephthalic acid such as disclosed and described in Patent 2,901,466, reference to which is hereby made.

The thickness of the extruded members employed in this invention can vary over a relatively wide range and will depend, in part, on the resin employed and the strength properties desired or required of the extruded member. Thicknesses of from about 10 mils to 500 mils have proved satisfactory. It is preferred that each member of which the case is comprised be of substantially the same thickness; however, the members can be of different thicknesses if desired. The several members of which the plastic case is comprised can be prepared from the same resin or from different resins.

The plastic case of this invention is comprised of (1) an elongated extruded plastic body member comprised of a pair of substantially parallel side walls having shoulders on the upper ends thereof and an intermediate web connecting the two sidewalls (the web in most instances will form the base of the plastic case), and (2) an extruded plastic spanner member having shoulder means on opposite edge portions thereof engageable with the shoulder means of the side walls of the body members. The shoulders of the spanner member and the shoulders of the body member provide means for securing the two members together and for preventing undesirable spreading of the side walls. Longitudinally extending groove means can be provided in the side walls of the body member and positioned above the intermediate web for receiving opposite edge portions of an apertured divider member.

Referring to FIG. 1 of the drawing, there is shown an elongated channel-shaped member 10 that has been prepared by extruding a molten resin such as polyethylene through an appropriate die structure. This member can be extruded to any convenient length. Thus, it can be extruded to the precise desired length to provide a body member, or it can be extruded into lengths of up to 20 feet or more and the resulting member cut into sections of desired lengths. The economy of extruding relatively long lengths and subsequently cutting them into sections of desired lengths to provide a plurality of body members is obvious.

The elongated channel-shaped member 10 is comprised of side walls 12 and 14 which are substantially parallel, one to the other, and which are connected to intermediate web 16, which as shown, serves as a base for the member 10. The side walls 12 and 14 and the web or base 16 are of substantially the same thickness. On the upper ends of each of the side walls, 12 and 14, are flanges (shoulders) 18 and 20. The flange 18 is approximately the same thickness as the side wall 12 and includes an outwardly extending portion 22 and a downwardly extending arcuate rim portion 24. Similarly, flange 20 includes an outwardly extending portion 26 and a downwardly extending arcuate rim portion 28. The side walls are also comprised of longitudinally extending grooves 30 and 32 defined by longitudinally extending rib sections 34 and 36, and 38 and 40, respectively. The role of the grooves 30 and 32 will be detailed hereinafter.

Referring now to FIG. 2 of the drawing, there is shown member 50 which is formed by extruding fused resinous material through an appropriately shaped die structure. The member 50 can be extruded to any convenient length and subsequently cut to the length desired to provide a plurality of spanner members of desired length, usually corresponding to the length of the body member.

Extruded member 50 is provided, at opposite edge portions thereof, with downwardly extending arcuate shoulders or flanges 52 and 54 adapted to be engaged with or secured to flanges 18 and 20 of body member 10. It will be apparent that securing together of the flanges of the spanner member 50 and the body member 10 can be accomplished by various means such as by force fitting the shoulders together, slidably engaging the shoulders, securing the shoulders together by means of appropriate adhesives, heat bonding, and the like. The secured together shoulders or flanges provide means for conveniently hand carrying or otherwise handling the plastic case.

As shown in FIG. 2 of the drawing, member 50 is provided, after extrusion, with a plurality of apertures 56 adapted to receive a container or similar article therein. These apertures can be provided by any convenient means such, for example, as by punching. While the apertures 56 are shown as circular apertures, it is to be understood that the shape of the apertures can be other than circular and will depend, in part, on the shape of the container to be received therein. Thus, for example, the shape of the aperture can be triangular, square, rectangular, elliptical, octagonal, and hexagonal. The member can be provided with apertures of several different shapes and sizes if desired.

In FIG. 3 of the drawing there is shown an extruded divider member 60 which has been provided subsequently, as by punching, with a plurality of apertures 62. Member 60 can be extruded to any desired length and subsequently cut into divider members of desired length, usually of the same length as the spanner member and the body member. As in the case of the member 50, these apertures are shown to be circular. However, it is to be understood that these apertures can have other shapes as set forth hereinabove with the description of the apertures of the member 50. As shown, the apertures 62 of the member 60 are substantially the same size as those of the member 50; however, it is to be understood that these apertures can be larger or smaller than the apertures of member 50 and also can be of different shapes, if desired, and, as will be apparent to those skilled in the art, will depend primarily on the size and shape of the container to be received within the apertures of these members. The grooves 30 and 32 of the side walls of the body member are adapted to receive the opposite edge portion 64 and 66, respectively, of member 60. Reception of these edge portions by the grooves is easily and readily accomplished by sliding engagement.

FIGS. 4 and 5 of the drawings show a plastic case 70 adapted for carrying 24 containers of circular cross section. The case 70 is comprised of body member 72, spanner member 74, and divider member 76, which members are obtained by cutting, to desired lengths, extruded members 10, 50, and 60, respectively.

Figure 6:
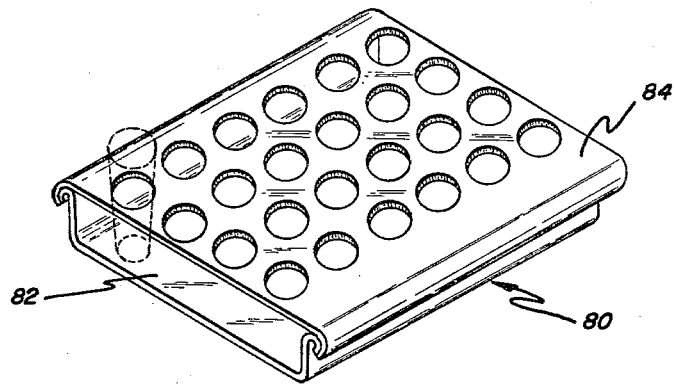
FIG. 6 is a view in perspective of a modified form of plastic case construction.

Certain containers, such as plastic coffee cups, wax coated paper soft drink containers, and the like do not always require a carrying case provided with the additional support and strength properties provided by the divider member and a plastic case comprised of a body member and a spanner member would easily provide satisfactory support for containers of this type. This aspect of the invention is shown in FIG. 6 of the drawing where there is shown a case 80 comprised of body member 82 and spanner member 84. Both spanner member and body member can be prepared by extrusion techniques and are provided with shoulder means as hereinabove discussed for use in securing the two members together to provide the desired plastic case.

The plastic cases of this invention can be used to store, transport, or otherwise handle containers made of glass, metal, plastic, paper, wax coated paper, plastic coated paper, and the like. The containers can be of different sizes and shapes. Containers of different sizes and shapes can be supported in the same case by providing spanner members and divider members with apertures of the required shape and size.

In addition, the plastic case of this invention can be assembled in such a manner as to be disassembled easily and readily. The body member will serve to provide cases adapted to support containers of different sizes and shapes. All that is required is that the spanner and divider members be replaced with spanner and divider members having apertures of desired size and shape.

Furthermore, if the body member is prepared from a polyolefin such as polyethylene or polypropylene, it can be provided with flexible joints along the line formed at the junction of each side wall with the intermediate web as indicated at A and B in FIG. 5 of the drawing. These flexible joints are sometimes referred to in the art as integral hinges. The method of forming these flexible joints can be accomplished by repeated flexing of the material along a line forming the axis of desired flexibility so that there is formed along said line a reoriented necked down portion. For description of a method of forming flexible joints in a semi-rigid solid plastic material, reference is made to Patent 3,019,486.

Thus, after the flexible joints have been provided in the body member, along a line formed substantially at the junction of the side walls and the intermediate web, the plastic case can be disassembled by removing therefrom the spanner member and the divider member followed by folding the side walls, either outwardly or inwardly, depending of course on how the flexible joint is formed initially. It will be apparent therefore that the bulk of the plastic case of this invention, after use, can be reduced substantially thereby qualifying for shipping rates that are substantially lower than those shipping rates otherwise obtainable.

The following example is illustrative of this invention.

*Example 1*

Fused cellulose acetate is extruded through a die having a cross section similar to the cross section of the member shown in the FIG. 1 of the drawing. The length of the extrusion is about 6 feet and the thickness of the side walls, the web or base portion and the shoulder portions, are substantially the same and are about 3/8 of an inch. The width of the web portion or base portion is about 12 inches, the height of the side walls is about 4 5/8 inches, and the grooves are positioned substantially midway in the side walls. A second member similar to that shown in FIG. 2 of the drawing is extruded (using fused cellulose acetate) through a die having a cross section substantially the same as that of the cross section of the member shown in FIG. 2 of the drawing. The length of this member is about 6 feet. Each member is cut into four separate sections, each section having a length of about 1½ feet, to provide 4 body members and 4 spanner members. Twenty-four evenly spaced apertures are punched in one of the spanner members, the diameter of the circular apertures being about 2 3/8 inches. A divider member is provided which has a length of about 18 inches, a width of about 11 inches and a thickness of about ¼ inch. This member is also provided with 24 evenly spaced apertures of the same size of the apertures provided in the spanner member. The apertured spanner member is force fitted to the body member at the respective shoulders of each member and divider member is placed in position by sliding it into the grooves provided in the side walls of the body member. The plastic case thus produced is similar to that shown in FIGS. 4 and 5 of the drawing.

*Example II*

A case similar to that of Example I is prepared using polyethylene as the resin for extrusion forming of the individual components thereof. A flexible joint is provided at each junction of a side wall of the body member with the intermediate web in accordance with the teachings of Patent 3,019,486.

It will be apparent from the foregoing that in accordance with this invention there is provided a plastic case of novel structure. The individual members or components of which it is comprised can be economically, readily, and easily prepared or produced by extrusion techniques, and the individual members easily and quickly assembled to provide a carrying case for supporting containers and like articles. Furthermore, as hereinabove set forth, the body member can be prepared from a polyolefin such as polyethylene or polypropylene and subsequently have provided therein at the line where the web and the side wall intersect an integral hinge for collapsing the body member.

Figure 7:
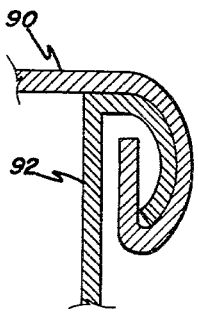
FIG. 7 is a fragmentary cross-sectional view of an arrangement for securing a spanner member to a body member.

It will be apparent to those skilled in the art, having before them the teachings of this invention, that the shoulder or flanges of the body member and the spanner member can be of different shapes than set forth hereinabove. For example, FIG. 7 of the drawing shows a different construction of a flange or shoulder 90 for a spanner member snugly fitted against and enclosing a portion of shoulder 92 of a body member. In an arrangement as shown in FIG. 7 of the drawing, the shoulders can be engaged by snap fitting the shoulder 90 over shoulder 92 or by slidably engaging the shoulders.

The ends of the plastic case 70 are open as shown. End members of appropriate size can be adhesively bonded to the exposed edges of spanner member 74, body member 72, and divider member 76, if desired, to provide a complete closure if desired. End members are not necessary however and add to the cost of construction.

It is to be understood that the above description, drawing, and examples are illustrative of this invention and not in limitation thereof.

I claim:

1. A case for supporting containers comprising
   (A) an extruded thermoplastic resin body member consisting of a pair of substantially parallel side walls connected to an intermediate web and shoulder means on the upper ends of said side walls, and
   (B) an extruded thermoplastic resin spanner member having apertures therein and having shoulder means engaged by securing means with the shoulder means of the side walls of the body member whereby undesired spreading of the side walls is reduced substantially.

2. The case of claim 1 wherein the thermoplastic resin is cellulose acetate.

3. A case for supporting containers comprising
   (A) an extruded polyolefin resin body member consisting of substantially parallel side walls connected to an intermediate web and shoulder means on the upper ends of said side walls, and
   (B) an extruded polyolefin resin spanner member having apertures therein and having shoulder means engaged by securing means with the shoulder means of the side walls of the body member whereby undesired spreading of the side walls is reduced substantially.

4. The case of claim 3 wherein there is at least one flexible joint in the body member thereof, said integral hinge being formed substantially along the line formed at the junction of one side wall with the intermediate web.

5. A case for supporting containers comprising
   (A) an elongated body member consisting of a pair of substantially parallel side walls connected to an intermediate web, longitudinally extending groove means in each of said side walls positioned above said web and adapted for receiving opposite edge portions of an apertured divider member, and shoulder means on the upper ends of each of said side walls,
   (B) an apertured spanner member having shoulder means engaged by securing means with the shoulder means of the side walls of the body member whereby undesired spreading of the side walls is reduced substantially, and
   (C) an apertured divider member positioned within the groove members of the side walls of said body member.

6. The case of claim 5 wherein the apertures in the divider member and the spanner member are in registration.

7. A case for supporting containers comprising
   (A) an extruded thermoplastic resin body member consisting of a pair of substantially parallel side walls connected to an intermediate web, longitudinally extending groove means in each of said side walls positioned above said web and adapted for receiving opposite edge portions of an apertured divider member, and shoulder means on the upper ends of each of said side walls,
   (B) an extruded thermoplastic resin spanner member having apertures therein and having shoulder means engaged by securing means with the shoulder means of the side walls of the body member whereby undesired spreading of the side walls is reduced substantially, and
   (C) an apertured divider member positioned within the groove members of the side walls of said body member.

8. The structure of claim 7 wherein the apertures of the divider member and the spanner member are in registration.

9. The case of claim 7 wherein the thermoplastic resin is cellulose acetate.

10. A case for supporting containers comprising
    (A) an extruded polyolefin resin body member consisting of a pair of substantially parallel side walls connected to an intermediate web, longitudinally extending groove means in each of said side walls positioned above said web and adapted for receiving opposite edge portions of an apertured divider member, and shoulder means on the upper ends of each of said side walls,
    (B) an extruded polyolefin resin spanner member having apertures therein and having shoulder means engaged by securing means with the shoulder means of the side walls of the body member whereby undesired spreading of the side walls is reduced substantially, and
    (C) an apertured divider member positioned within the groove members of the side walls of said body member.

11. A case for supporting containers comprising
    (A) an extruded polyethylene resin body member consisting of a pair of substantially parallel side walls connected to an intermediate web, longitudinally extending groove means in each of said side walls positioned above said web and adapted for receiving opposite edge portions of an apertured divider member, and shoulder means on the upper ends of each of said side walls,
    (B) an extruded polyethylene resin spanner member having apertures therein and having shoulder means engaged by securing means with the shoulder means of the side walls of the body member whereby undesired spreading of the side walls is reduced substantially, and (C) an apertured divider member positioned within the groove members of the side walls of said body member.

12. A case for supporting containers comprising
(A) an extruded polypropylene resin body member consisting of a pair of substantially parallel side walls connected to an intermediate web, longitudinally extending groove means in each of said side walls positioned above said web and adapted for receiving opposite edge portions of an apertured divider member, and shoulder means on the upper ends of each of said side walls,
(B) an extruded polypropylene resin spanner member having apertures therein and having shoulder means engaged by securing means with the shoulder means of the side walls of the body member whereby undesired spreading of the side walls is reduced substantially, and
(C) an apertured divider member positioned within the groove members of the side walls of said body member.

13. The case of claim 11 wherein there is at least one flexible joint in the body member thereof, said flexible joint being formed substantially along the line formed at the junction of one side wall with the intermediate web.

14. The case of claim 12 wherein there is at least one flexible joint in the body member thereof, said flexible joint being formed substantially along the line formed at the junction of one side wall with the intermediate web.

References Cited by the Examiner

UNITED STATES PATENTS

| | | | |
|---|---|---|---|
| 362,375 | 5/87 | Galbraith. | |
| 626,917 | 6/99 | Lutz | 220—41 |
| 792,233 | 6/05 | Norman. | |
| 804,110 | 11/05 | Favorite et al. | 220—41 |
| 926,537 | 6/09 | Bagley | 220—41 |
| 1,188,146 | 6/16 | Bogley | 211—74 X |
| 1,344,242 | 6/20 | Baehr | 211—74 |
| 2,359,209 | 9/49 | Ellinwood | 248—74 |
| 2,563,865 | 8/51 | Pottle | 220—41 X |
| 2,574,983 | 11/51 | Reed | 220—21 |
| 2,614,727 | 10/52 | Robinson | 220—60 |
| 2,714,443 | 8/55 | Kuvin | 220—22 X |
| 2,748,952 | 6/56 | Fleit et al | 211—74 |
| 2,759,337 | 8/56 | Katz. | |
| 2,792,962 | 5/57 | Granfelt | 220—21 |
| 2,833,324 | 5/58 | Burroughs | 220—60 |
| 2,979,210 | 4/61 | Patterson | 211—74 |
| 2,985,333 | 5/61 | Kirkman | 220—22 |
| 3,106,308 | 10/63 | Kazimier | 220—21 |

CLAUDE A. LE ROY, *Primary Examiner.*